Figure 1:
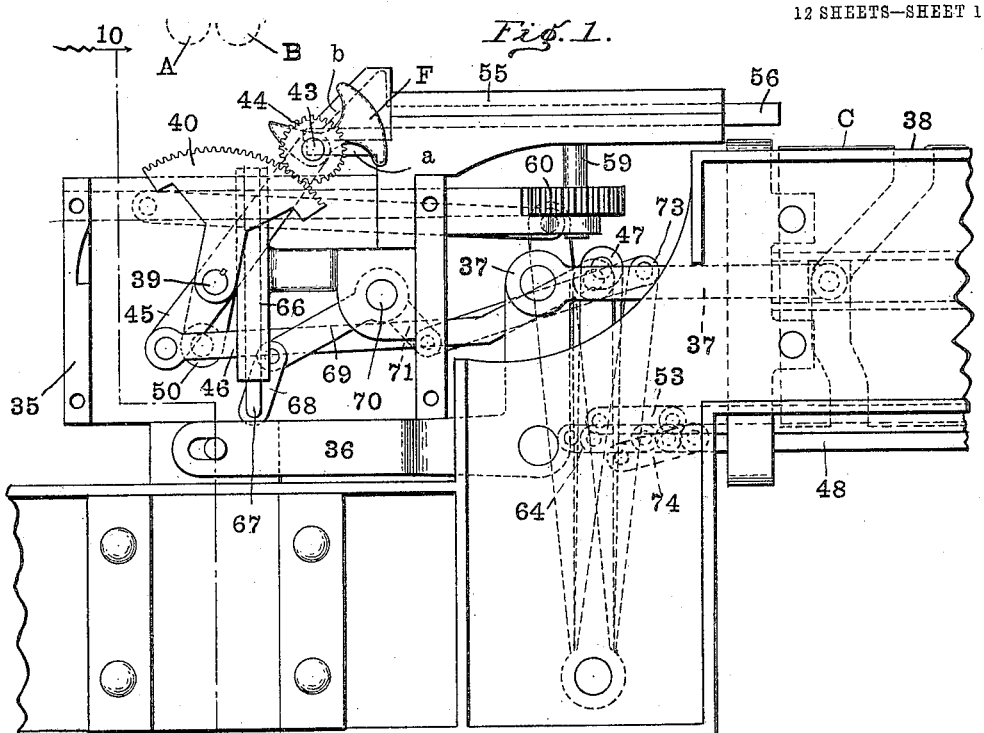

No. 822,563. PATENTED JUNE 5, 1906.
C. B. WANAMAKER & C. B. MILES.
TUCKER FOR STRAW BINDERS.
APPLICATION FILED SEPT. 14, 1903.

12 SHEETS—SHEET 1.

Witnesses
Frank A. Fahle
J. A. Walsh.

Inventors
Charles B. Wanamaker
Clarence B. Miles
By Bradford Hood
Attorneys

No. 822,563. PATENTED JUNE 5, 1906.
C. B. WANAMAKER & C. B. MILES.
TUCKER FOR STRAW BINDERS.
APPLICATION FILED SEPT. 14, 1903.

12 SHEETS—SHEET 4.

Witnesses
Frank A. Fahle
J. A. Walsh

Inventors
Charles B. Wanamaker
Clarence B. Miles
By Bradford Hood
Attorneys

No. 822,563. PATENTED JUNE 5, 1906.
C. B. WANAMAKER & C. B. MILES.
TUCKER FOR STRAW BINDERS.
APPLICATION FILED SEPT. 14, 1903.

12 SHEETS—SHEET 5.

Witnesses
Inventors
Charles B. Wanamaker
Clarence B. Miles
By Bradford & Hood
Attorneys No. 822,563. PATENTED JUNE 5, 1906.
C. B. WANAMAKER & C. B. MILES.
TUCKER FOR STRAW BINDERS.
APPLICATION FILED SEPT. 14, 1903.
12 SHEETS—SHEET 6.
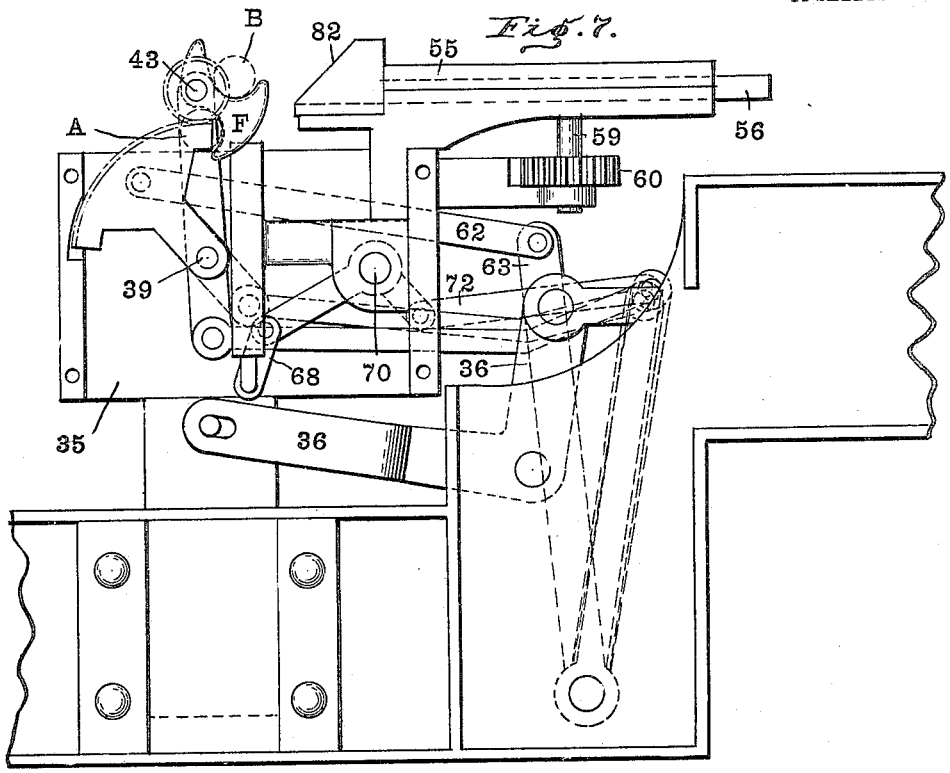
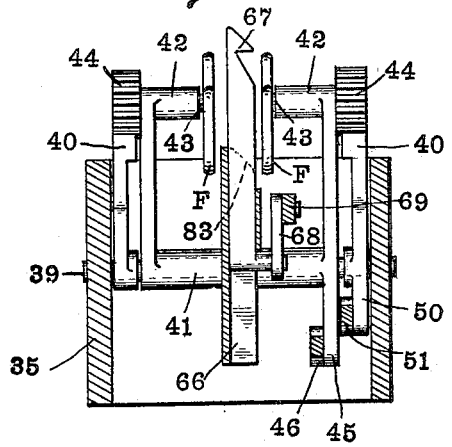
Witnesses
Frank A. Fahle
J. A. Walsh
Inventors
Charles B. Wanamaker
Clarence B. Miles
By
Bradford Hood
Attorneys No. 822,563. PATENTED JUNE 5, 1906.
C. B. WANAMAKER & C. B. MILES.
TUCKER FOR STRAW BINDERS.
APPLICATION FILED SEPT. 14, 1903.

12 SHEETS—SHEET 7.

Witnesses
Frank S. Sahle
J. A. Walsh

Inventors
Charles B. Wanamaker
Clarence B. Miles
By Bradford & Hood
Attorneys

No. 822,563. PATENTED JUNE 5, 1906.
C. B. WANAMAKER & C. B. MILES.
TUCKER FOR STRAW BINDERS.
APPLICATION FILED SEPT. 14, 1903.

12 SHEETS—SHEET 8.

Witnesses
Frank A. Fahle
J. A. Walsh,

Inventors
Charles B. Wanamaker
Clarence B. Miles
By
Badford & Hood
Attorneys

No. 822,563. PATENTED JUNE 5, 1906.
C. B. WANAMAKER & C. B. MILES.
TUCKER FOR STRAW BINDERS.
APPLICATION FILED SEPT. 14, 1903.

12 SHEETS—SHEET 10.

Witnesses
Inventors
Charles B. Wanamaker
Clarence B. Miles
By
Attorneys

No. 822,563. PATENTED JUNE 5, 1906.
C. B. WANAMAKER & C. B. MILES.
TUCKER FOR STRAW BINDERS.
APPLICATION FILED SEPT. 14, 1903.

12 SHEETS—SHEET 11.

Witnesses
Adelaide Kearns
J. A. Walsh

Inventors
Charles B. Wanamaker
Clarence B. Miles
By Bradford Hood
Attorneys

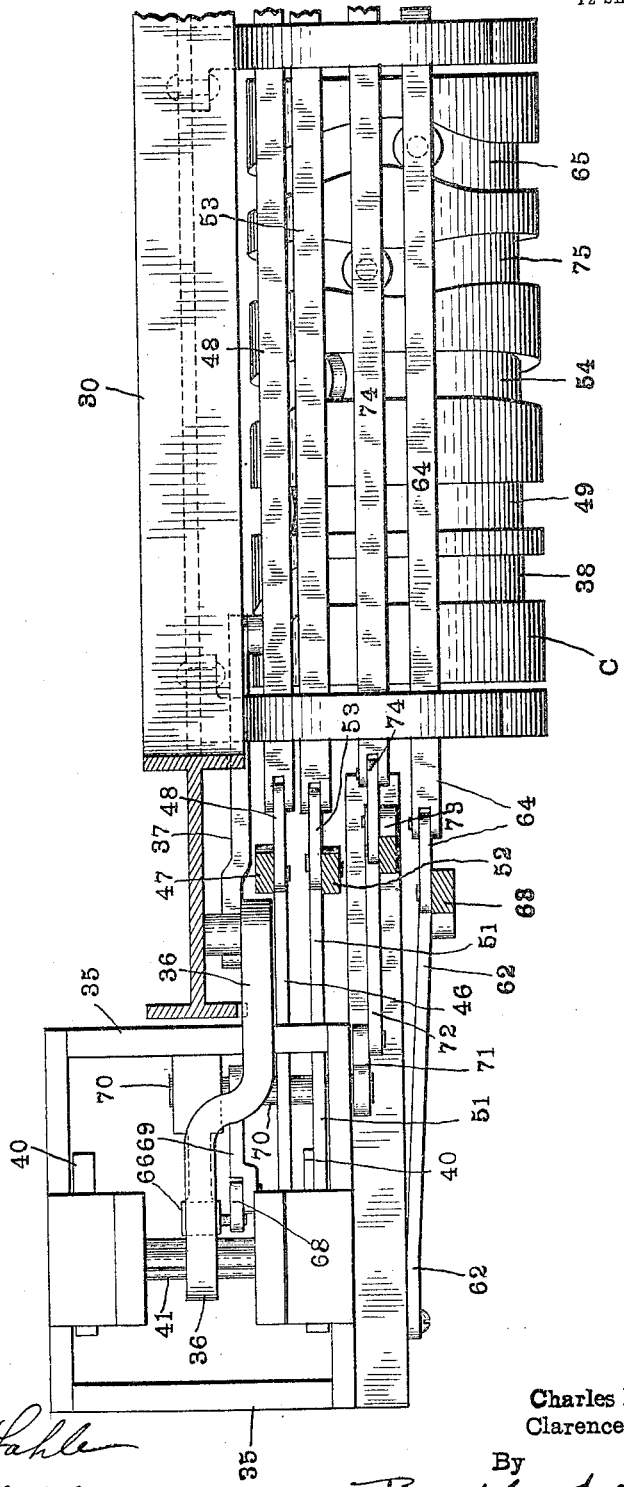

UNITED STATES PATENT OFFICE.

CHARLES B. WANAMAKER AND CLARENCE B. MILES, OF INDIANAPOLIS, INDIANA, ASSIGNORS TO THE BROWN STRAW BINDER COMPANY, OF INDIANAPOLIS, INDIANA, A CORPORATION OF INDIANA.

TUCKER FOR STRAW-BINDERS.

No. 822,563.     Specification of Letters Patent.     Patented June 5, 1906.

Application filed September 14, 1903. Serial No. 173,217.

*To all whom it may concern:*

Be it known that we, CHARLES B. WANAMAKER and CLARENCE B. MILES, citizens of the United States, residing at Indianapolis, in the county of Marion and State of Indiana, have invented certain new and useful Improvements in Tuckers for Straw-Binders, of which the following is a specification.

The object of our invention is to produce an improvement in tucking mechanism for fastening a wisp or rope of straw which has been formed integral with and around a bundle, the band being produced by intertwisting the butt-ends of straw picked from the periphery of the bundle by any desired means—as, for instance, such as is described and claimed in Patents Nos. 553,203 and 553,411, issued to The Brown Straw Binder Company, or such as is shown in Patent No. 780,391. It is to be understood, however, that said tucking mechanism is not necessarily limited to use in connection with the type of binding rope or wisp shown in said patents and application.

The accompanying drawings illustrate our invention in connection with means for producing a binding-rope in the manner described, which mechanism forms the subject-matter of a companion application.

Figure 2:
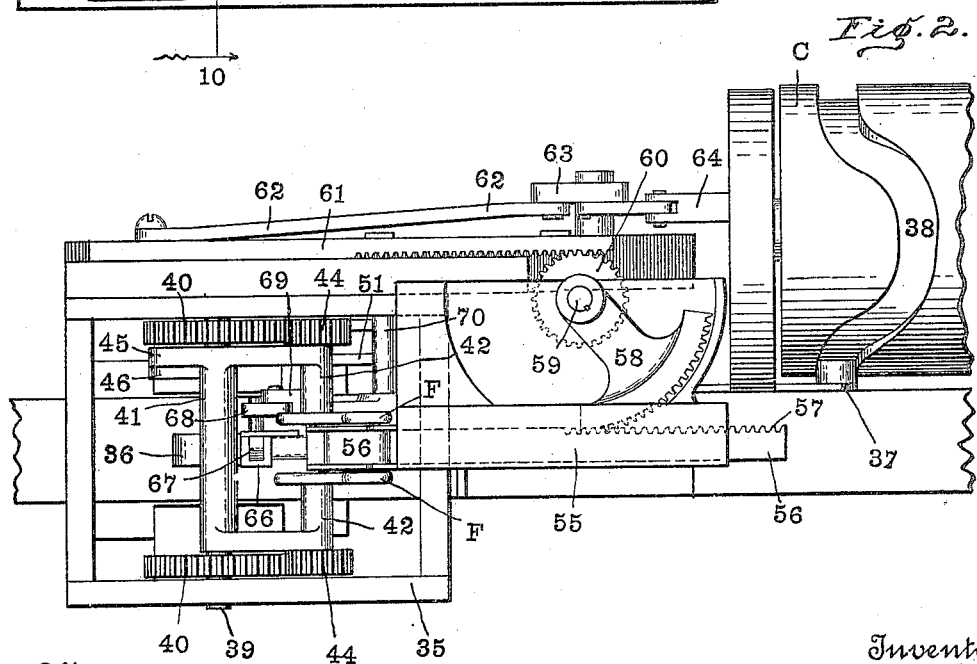
Figure 3:
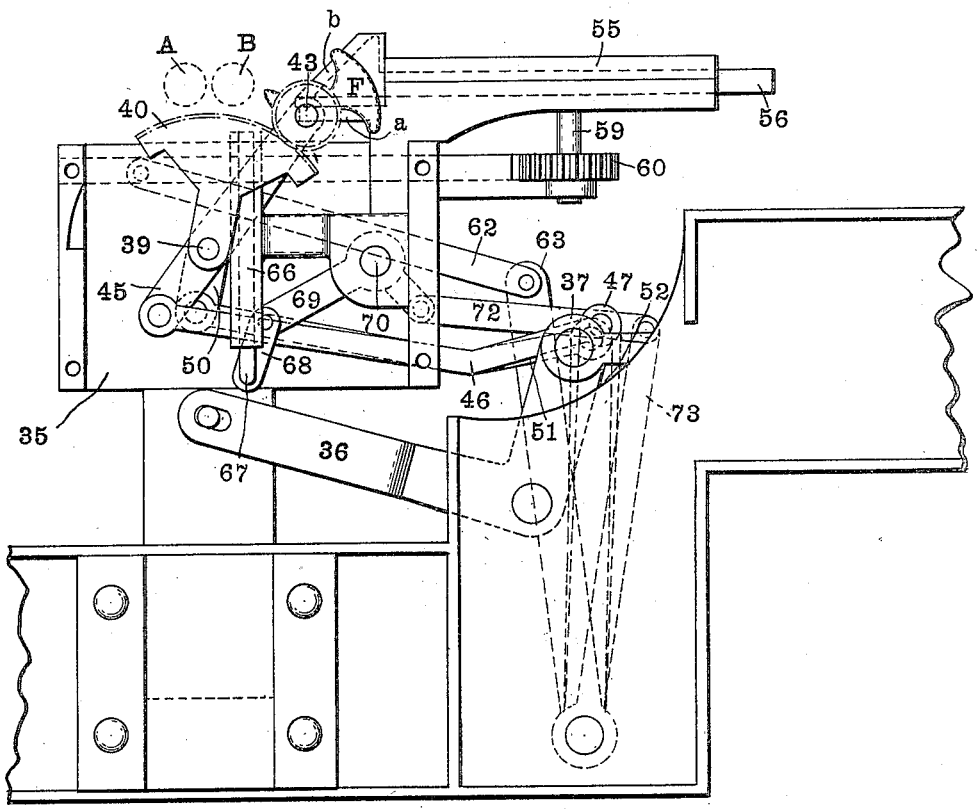
Figure 4:
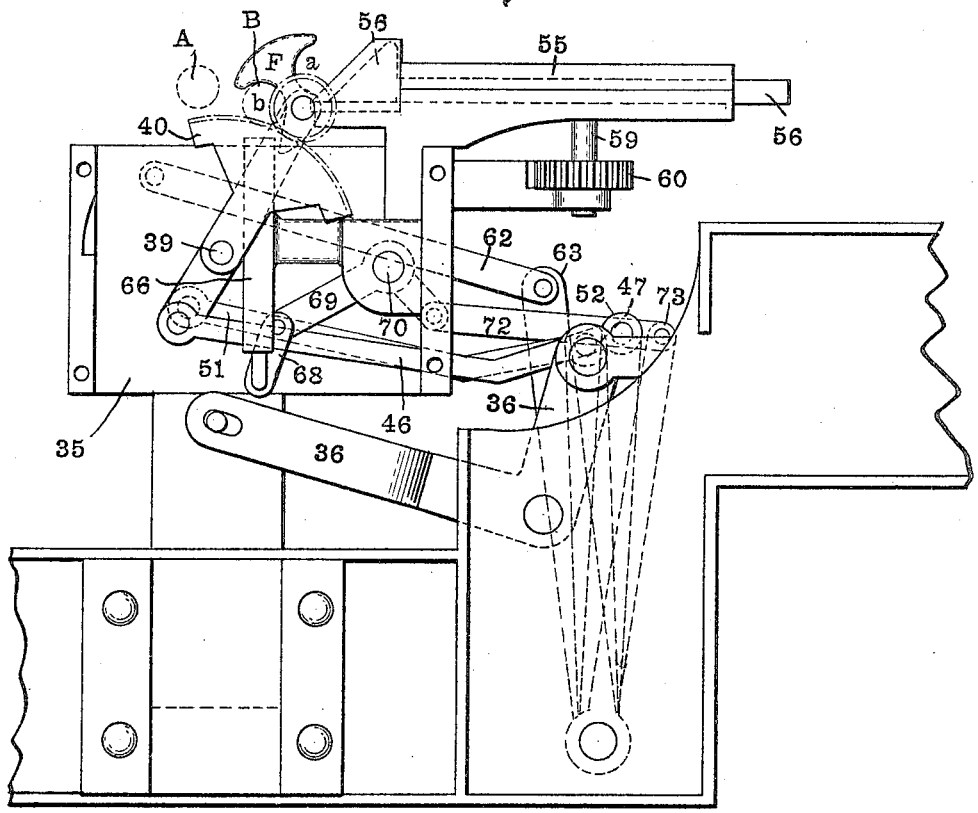
Figure 5:
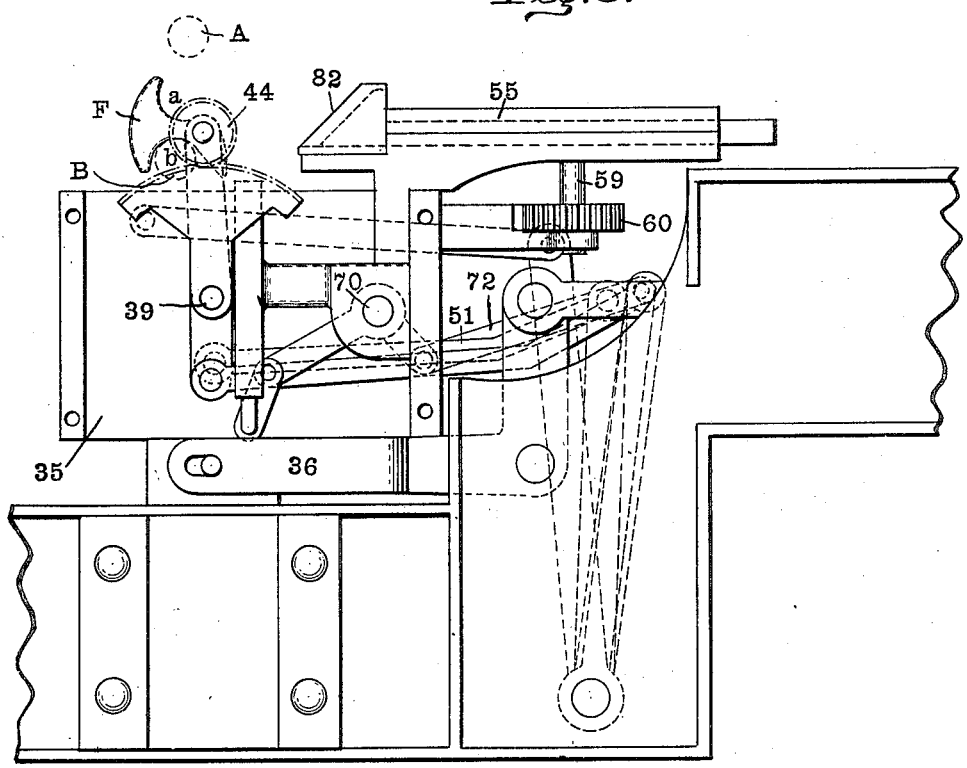
Figure 10:
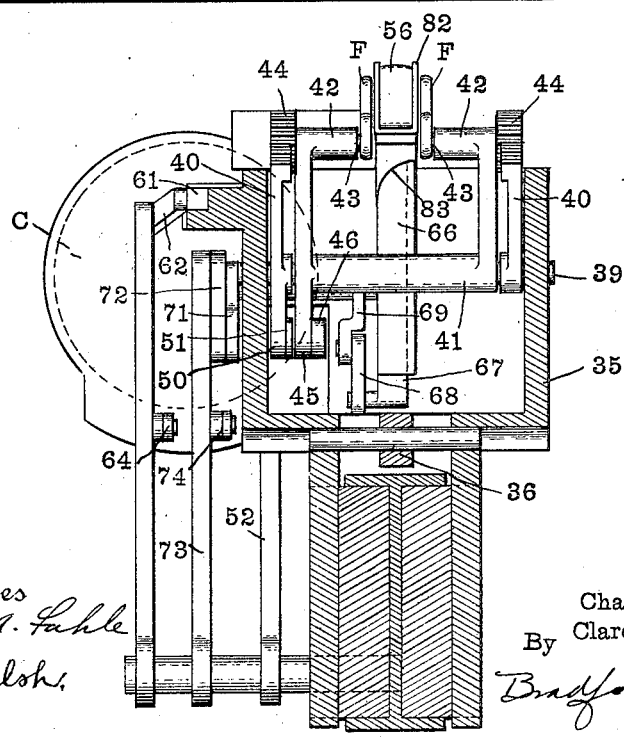
Figure 6:
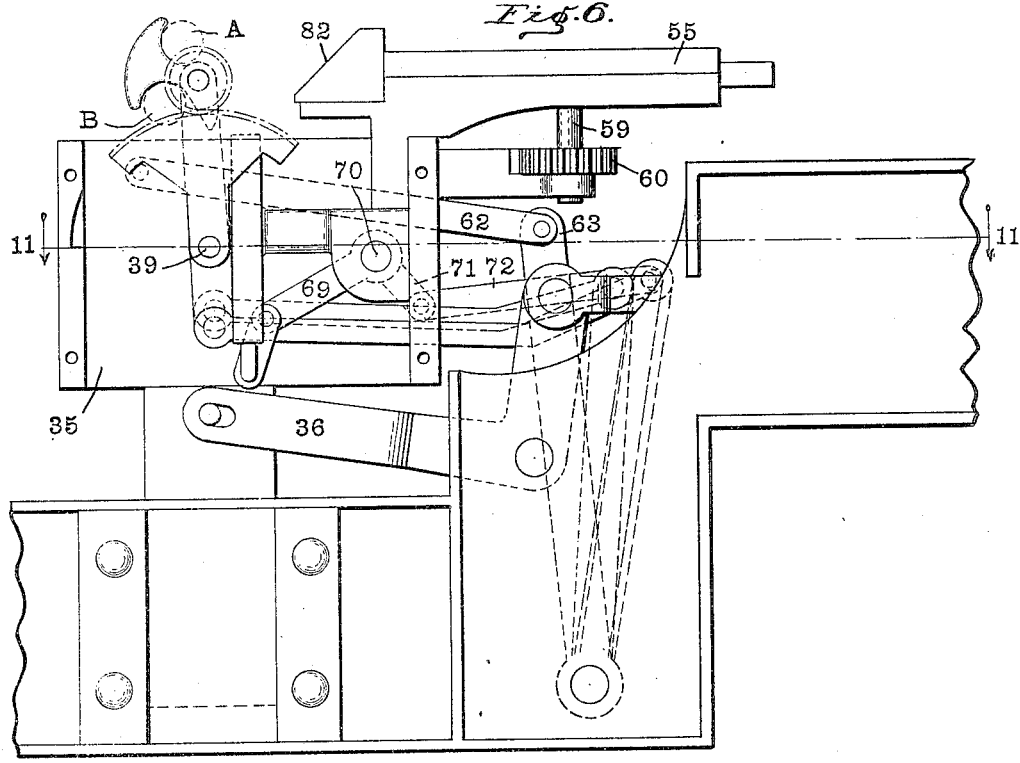
Figure 11:
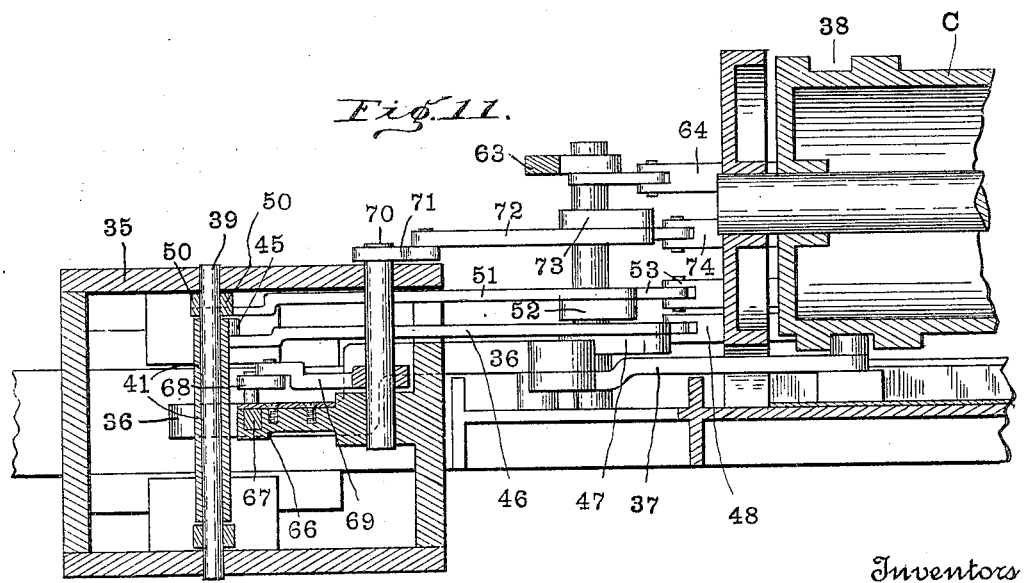
Figure 8:
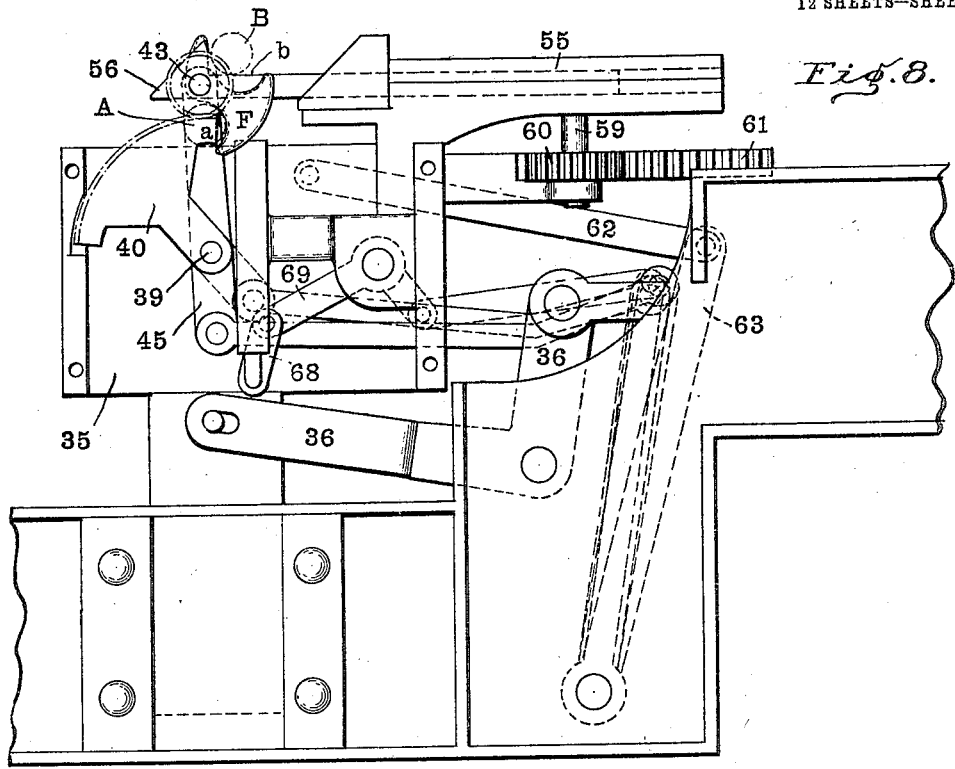
Figure 9:
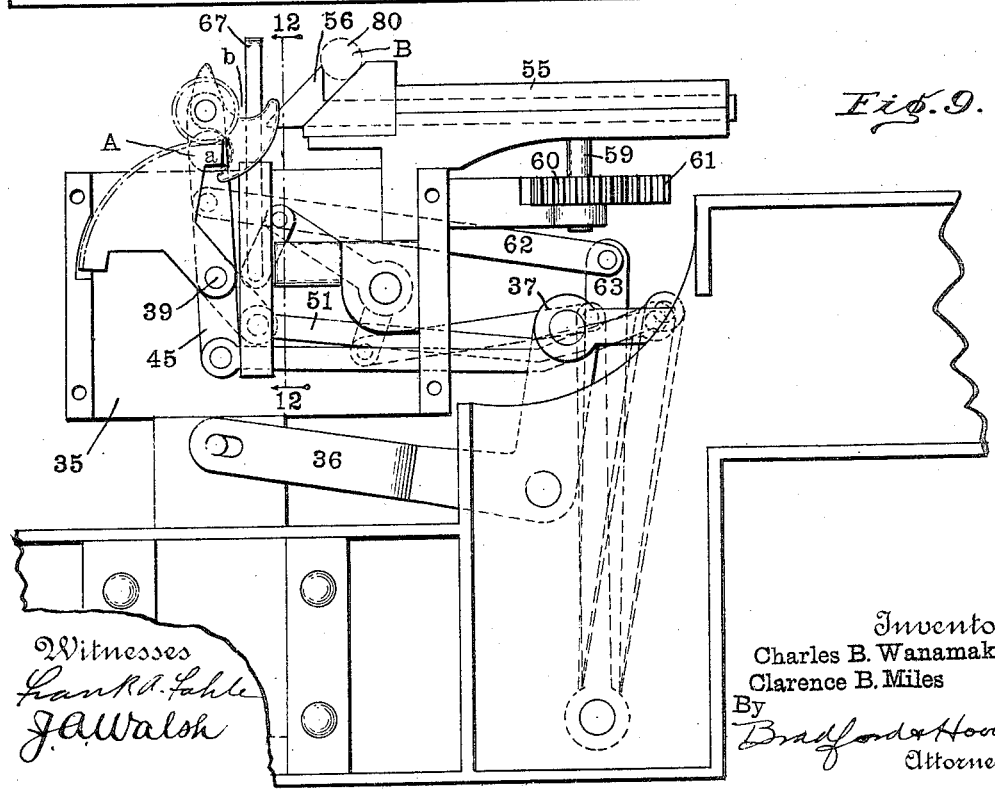
Figure 13:
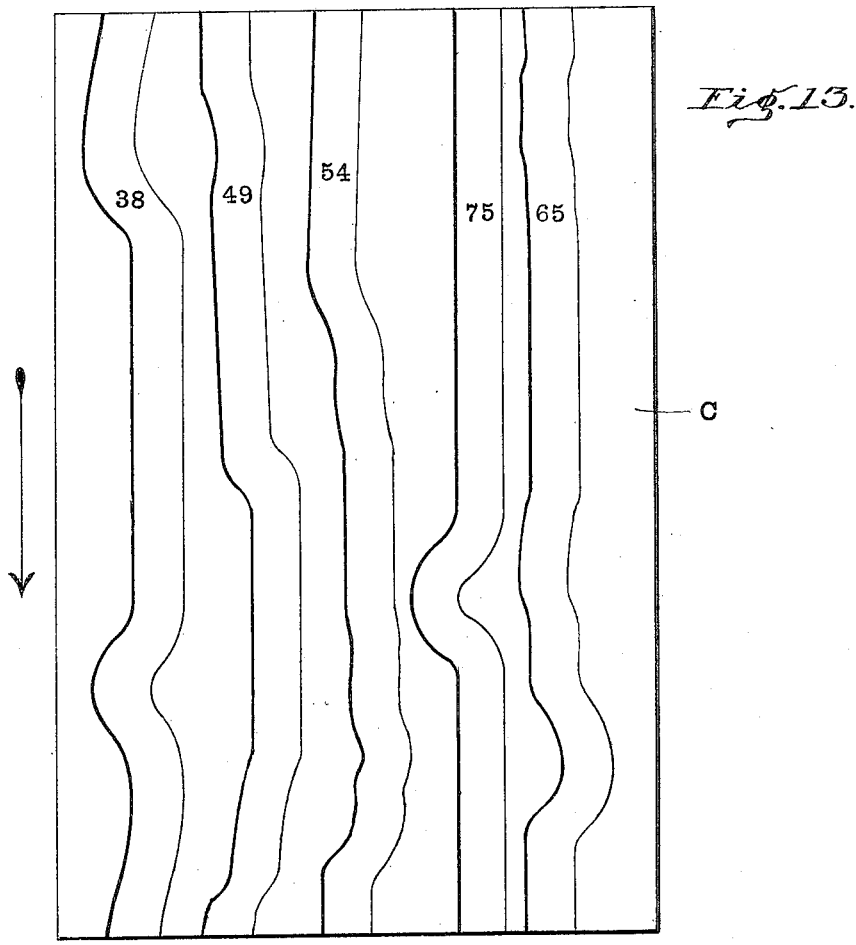
Figure 14:
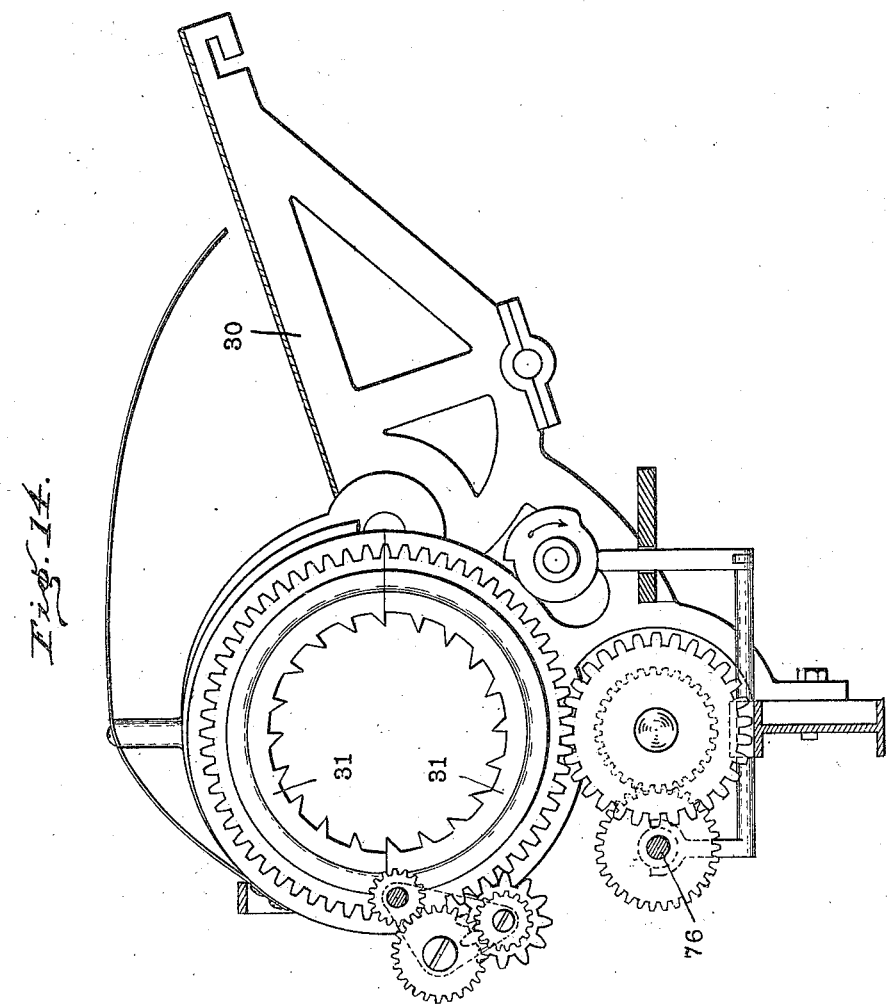
Figure 15:
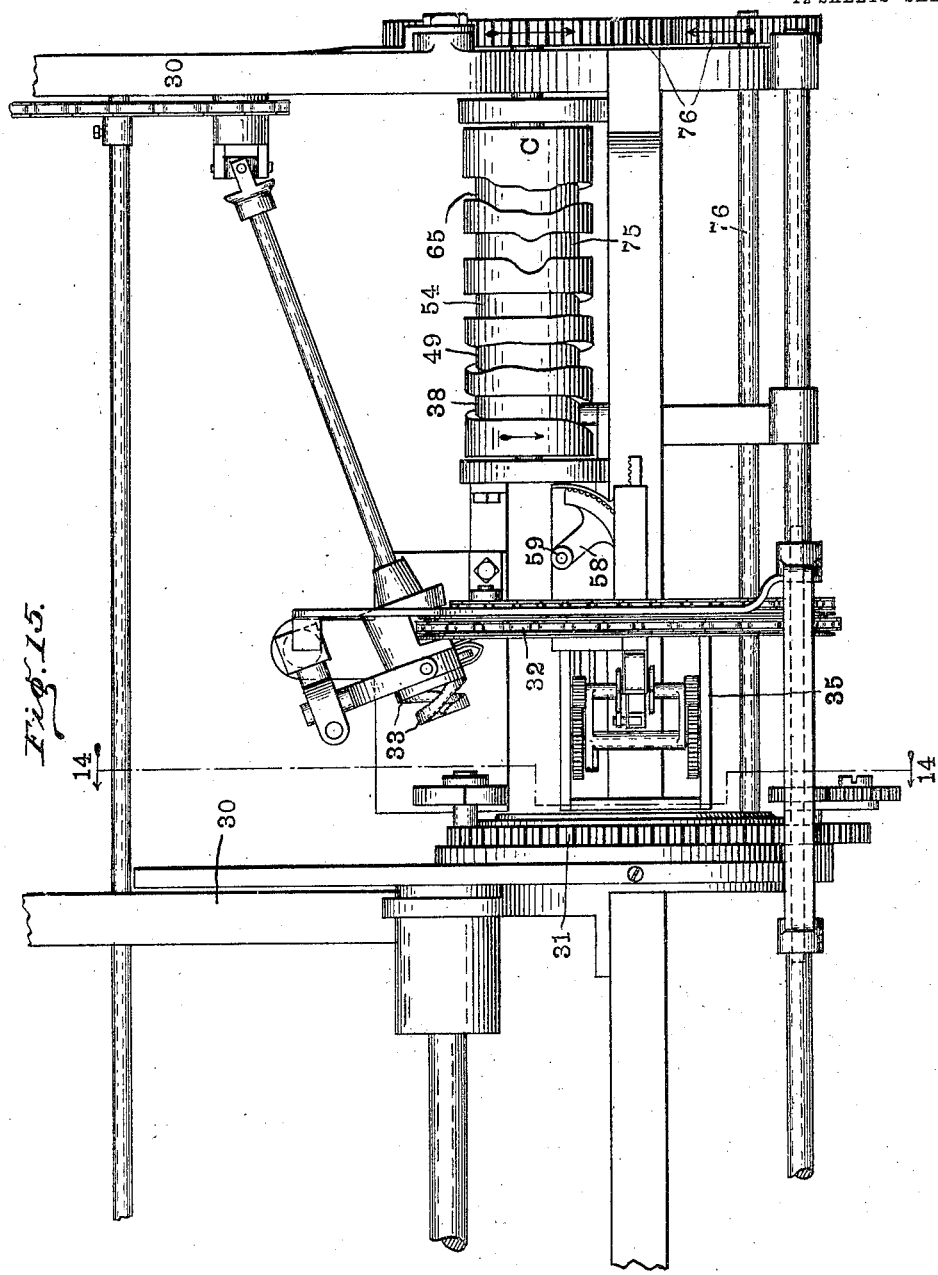
Figure 16:
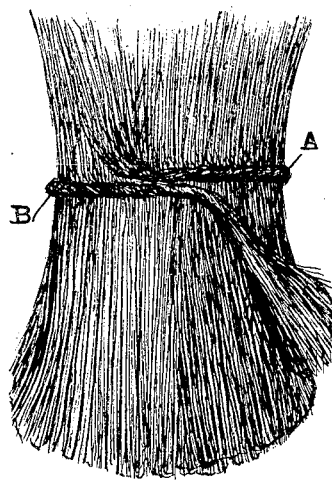
Figure 17:
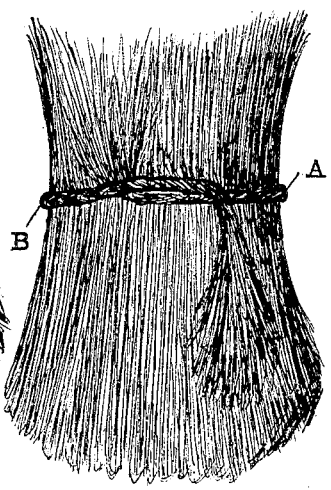
Figure 18:
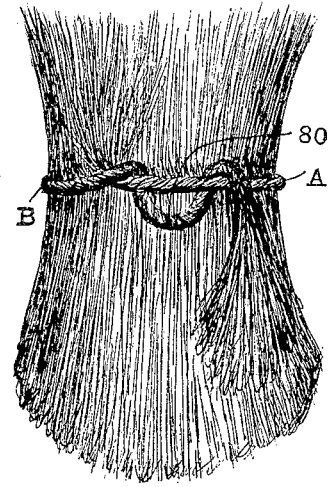
Figure 19:
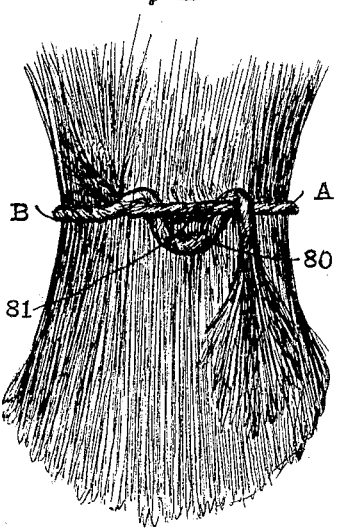
Figure 20:
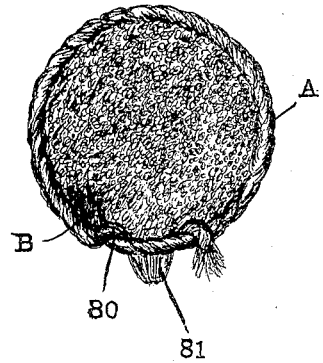

In the drawings, Figure 1 is a side elevation of the tucking mechanism in normal position, the face-plate of the elevator having been removed. Fig. 2 is a plan of the parts shown in Fig. 1 with the face-plate replaced. Fig. 3 is a view similar to Fig. 1, showing the elevator in its raised position. Fig. 4 is a similar view showing the swinging fingers thrown into engagement with the final end of the rope. Fig. 5 is a similar view showing the elevator depressed and the final end of the rope carried beneath the initial end. Fig. 6 is a similar view with the parts in the next position with the swinging fingers thrown up and into engagement with and behind the initial end of the rope. Fig. 7 is a similar view of the next position with the two ends of the rope reversed. Fig. 8 is a similar view of the parts in the next position with the tucker-hook projected beneath and behind the final end of the rope. Fig. 9 is a similar view with the tucker-hook retracted, a bight of the final end of the rope drawn beneath the initial end of the rope and the tie-hook projected into position. Fig. 10 is a section on line 10 10 of Fig. 1. Fig. 11, a horizontal section on line 11 11 of Fig. 6; Fig. 12, a section on line 12 12 of Fig. 9; Fig. 13, a development of the cams for operating the various portions of the tucker mechanism; Fig. 14, a section on line 14 14 of Fig. 15; Fig. 15, a plan of the tucker, together with its operating-cam and gearing for operating the same and the twisting mechanism for forming the rope; Figs. 16 to 20, diagrams showing the successive steps in the production of the tuck and fastening; and Fig. 21 is an under plan of the cam, the cam-slide, and parts operated thereby.

In the drawings, 30 indicates a suitable frame forming part of the receiving or binding table of a self-binding harvester of any desired type, which in the present drawings is in general like that shown in Patent No. 553,203, previously mentioned.

The bundle in the present case is formed by delivering straw within a two-part ring 31 31, which is positively driven in order to rotate the bundle after it is formed. As the bundle is rotated straw is picked out from the periphery of the bundle by means of a chain 32 and delivered to a twister 33, which forms from the butt-ends of said picked-out straw a continuous rope around the bundle, the final end B being laid alongside the initial end A at a point adjacent the tucking mechanism which is now to be described. The particular means for forming the rope forms the subject-matter of our pending application Serial No. 214,129 and need not be here specifically described, as the operation of the tucking mechanism is entirely independent of the twisting mechanism and, as previously stated, is also independent of the particular type of rope to be used.

The tucking mechanism is carried in an elevator-box 35, which is vertically reciprocable in suitable guides in the frame by means of a bell-crank lever 36, which lever is connected by a link 37 with the cam-groove 38 of the cam C. Journaled in the elevator 35 at right angles to the bundle is a shaft 39, to the ends of which are keyed two segmental gears 40 40. Sleeved upon shaft 39 between the segmental gears 40 is a frame 41, which carries a pair of bearings 42 42, which are parallel with shaft 39 and extend toward each other, but do not meet. Journaled in each bearing 42 is a shaft 43, upon the outer end of each of which is secured a pinion 44, which meshes with the adjacent segment 40. Secured to the inner end of each shaft 43 is a swinging finger F, which is provided on opposite sides with a pair of rope-receiving sockets a and b. Forming part of frame 41 is an arm 45, which is connected by a link 46 to a lever 47, which in turn is connected by a sliding bar and link 48 with the cam-groove 49 of cam C. Secured to shaft 39 is an arm 50, connected by a link 51 with a lever 52, which is connected by a sliding bar and link 53 with cam-groove 54 of cam C. Mounted in the elevator 35 in a suitable slideway 55, so as to slide along a line parallel with the line of the straws in the bundle and at right angles to shaft 39, is a tucker-hook 56, provided on its side with a rack 57, with which meshes a segment 58, carried by a shaft 59, journaled in the elevator. Secured to shaft 59 is a pinion 60, which meshes with a sliding rack 61, also carried on the elevator. Rack 61 is connected by a link 62, lever 63, and sliding link and bar 64 with cam-groove 65 of cam C. Vertically slidable in a suitable guide 66, carried by the elevator between the two swinging fingers F F, is a fastener-hook 67, connected by link 68 and arm 69 with a shaft 70, journaled in the elevator. Shaft 70 is provided with an arm 71, which is connected by link 72 with a lever 73, which in turn is connected by a sliding link and bar 74 with cam-groove 75 of cam C.

Cam C is driven by any suitably-timed gearing from any desired point of the machine, in the present case this driving being accomplished by a suitable train of gears and shafting 76.

Finger 56 coöperates at the inner end of its stroke with a cam 82, which operates to strip the bight 80 from the hook, and similarly hook 67 coöperates with a cam 83, which strips bight 81 from the fastener-hook.

In operation, suppose the binding-rope to have been formed about the bundle with initial end A and final end B laid side by side, as indicated by the dotted lines in Fig. 1. Thereupon cam C is rotated, and the first movement swings lever 36 so as to elevate the elevator 35 to the position shown in Fig. 3. Continued movement of the cam, Fig. 4, swings frame 41 to the left and segment 40 to the right, thus throwing the swinging fingers F toward end B of the rope and simultaneously swinging said fingers upon shafts 43, so as to grasp rope B in recess b. Continued movement of the cam draws the elevator 35 downward to the position shown in Fig. 5, frame 41 and segment 40 being simultaneously moved to the left, so as to draw rope-end B down below and shift the same beneath rope-end A. Thereupon the elevator is raised so as to project fingers F upward, and thus seat rope-end A in notches a, as shown in Fig. 6. Thereupon, Fig. 7, frame 41 is held stationary, while the segments 40 are thrown to the left, thus swinging fingers F to the right, so as to invert the positions of the rope-ends A and B, the end B being thrown around and up toward the bundle and above (by rotation of gears 44) end A, while end A is depressed away from the bundle. Thereupon cam-groove 65 operates to project the tucker-finger 56 to the position shown in Fig. 8, said finger passing between rope-ends A and B, beneath the end B, and behind the same. Thereupon tucker-finger 56 is retracted to the position shown in Fig. 9, thus drawing a bight 80 of the rope-end B between rope-end A and the body of the bundle. It may be that this would be sufficient to hold the bundle, and under most circumstances we think it would; but we prefer to prevent any possibility of the bight of the rope-end B from being drawn from beneath rope-end A, and therefore as soon as the bight of rope-end B has been formed the hook 67 is projected, as shown in Fig. 9, upward and into the bundle, so as to grasp a small wisp of straw, a bight 81 of which is thereupon drawn downward between the two sides of the bight of rope-end B and the rope-end A, thus forming a lock which will prevent any possibility of accidental retraction of the bight of rope-end B. The bight 81 is formed by the simultaneous retraction of hook 67 into elevator 35 and the downward movement of said elevator to normal position, so that the parts assume the position shown in Fig. 1. Before hook 67 is drawn downward segments 40 are thrown to the right from the position shown in Fig. 9, thus swinging fingers F to the left, so as to retract them from between the bundle and rope-end A, and thus permit rope-end A to clamp down upon the bight of rope-end B, and thereafter hook 67 and elevator 35 are drawn down to normal.

We claim as our invention—

1. In a bundle-binder, the combination, with means for supporting the bundle and a binding-rope about the same, of means for carrying one end of said rope over the other, so as to hold said other end between it and the bundle and for carrying a bight of said first-mentioned end between the other end and the bundle.

2. In a bundle-binder, the combination, with means for supporting the bundle and a binding-rope about the same, of means for carrying one end of said rope over the other, so as to hold said other end between it and the bundle and for carrying a bight of said first-mentioned end between the other end and the bundle, and means for carrying a portion of the material of the bundle through said bight upon the bight side of the other end of the rope.

3. In a bundle-binder, the combination, with means for supporting the bundle and a binding-rope about the same, of means for carrying one end of said rope over the other, so as to hold said other end between it and the bundle and for carrying a bight of said first-mentioned end between the other end and the bundle, and means for drawing a bight of material from the bundle through the first-mentioned bight between it and the other end of the rope.

4. In a bundle-binder, a tucking mechanism therefor consisting of the finger, means for projecting said finger into engagement with one end of a tying-rope, means for carrying said finger with said end of the tying-rope over the other end of the tying-rope, for projecting the other side of said finger into engagement with the other end of the tying-rope and for carrying the first-mentioned end of the rope toward the bundle and the last-mentioned end away from the bundle, and means for engaging said first-mentioned end and drawing a bight of the same between the last-mentioned end and the bundle.

5. In a bundle-binder, a tucking mechanism therefor consisting of the finger, means for projecting said finger into engagement with one end of a tying-rope, means for carrying said finger with said end of the tying-rope over the other end of the tying-rope, for projecting the other side of said finger into engagement with the other end of the tying-rope and for carrying the first-mentioned end of the rope toward the bundle and the last-mentioned end away from the bundle, means for engaging said first-mentioned end and drawing a bight of the same between the last-mentioned end and the bundle, and means for drawing a bight of bundle material through said first-mentioned bight between it and the last-mentioned rope-end.

6. In a bundle-binder, a tucking mechanism consisting of an elevator, a swinging finger journaled therein, and means for swinging and rotating said finger into successive engagement with the two ends of the tying-rope whereby one is led over the other, a tucker-hook also mounted on the elevator, and means for projecting said tucker-hook into engagement with one end of the rope and withdrawing said finger so as to draw a bight of said rope-end between the other end of the rope and the bundle.

7. In a bundle-binder, a tucking mechanism consisting of an elevator, a swinging finger journaled therein, means for swinging and rotating said finger into successive engagement with the two ends of the tying-rope whereby one is led over the other, a tucker-hook also mounted on the elevator, and means for projecting said tucker-hook into engagement with one end of the rope and for withdrawing said finger so as to draw a bight of said rope-end between the other end of the rope and the bundle, a fastener-hook also mounted on said elevator, and means for projecting said fastener-hook into the bundle at a point between the sides of said bight and for retracting said hook so as to draw a bight of bundle material between the arms of the first-mentioned bight and the other end of the rope.

8. In a bundle-binder, a tucking mechanism consisting of a swinging frame having a swinging finger journaled thereon, a pinion carried by said finger, a gear meshing with said pinion, means for swinging said frame and for driving said gear independently, and means for moving said frame and finger toward and from the bundle.

9. In a bundle-binder, a tucking mechanism therefor consisting of elevator 35, frame 41 journaled thereon, finger F and gear 44 journaled on said frame, segment 40 meshing with said gear 44 and journaled on the elevator, means for raising and lowering the elevator, means for swinging frame 41, means for moving segment 40, tucker-finger 56, and means for projecting and retracting said tucker-finger, all substantially as and for the purposes set forth.

10. In a bundle-binder, a tucking mechanism therefor consisting of elevator 35, frame 41 journaled thereon, finger F and gear 44 journaled on said frame, segment 40 meshing with said gear 44 and journaled on the elevator, means for raising and lowering the elevator, means for swinging frame 41, means for moving segment 40, tucker 56, means for projecting and retracting said tucker-finger, fastener-hook 67, and means for projecting and retracting said hook, all substantially as and for the purposes set forth.

In witness whereof we have hereunto set our hands and seals, at Indianapolis, Indiana, this 8th day of September, A. D. 1903.

CHARLES B. WANAMAKER. [L. S.]
  CLARENCE B. MILES. [L. S.]

Witnesses:
 ARTHUR M. HOOD,
 JAMES A. WALSH.